April 1, 1958

M. KHEK 2,829,184

LOW FREQUENCY INDUCTION FURNACE FOR MELTING NON-FERROUS METALS

Filed July 28, 1955

INVENTOR
Massimiliano Khek

BY
ATTORNEY

April 1, 1958 M. KHEK 2,829,184
LOW FREQUENCY INDUCTION FURNACE FOR
MELTING NON-FERROUS METALS
Filed July 28, 1955 5 Sheets-Sheet 2
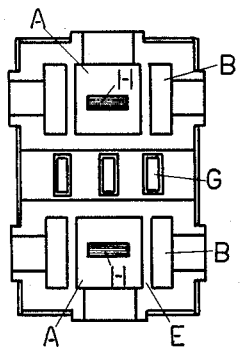
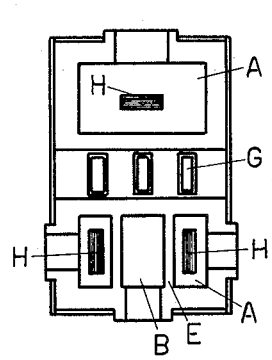
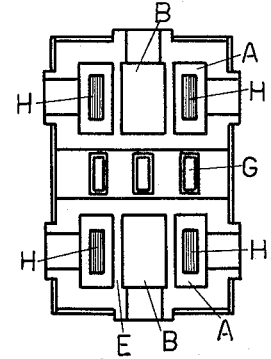
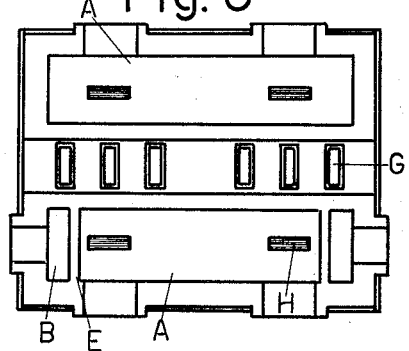
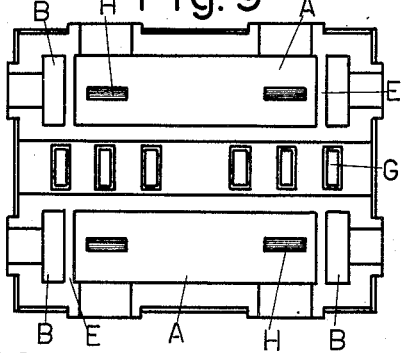
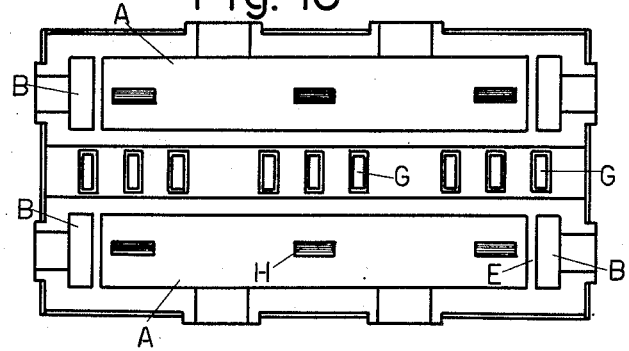
INVENTOR
Massimiliano Khek
BY
ATTORNEY

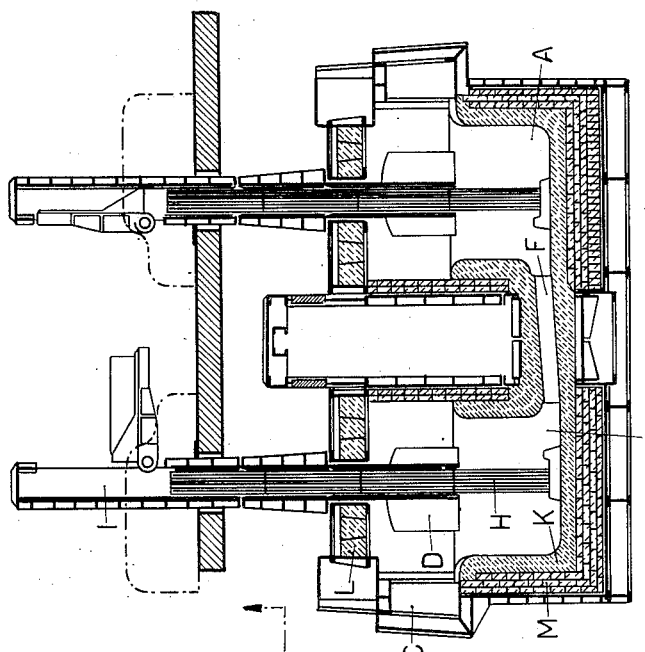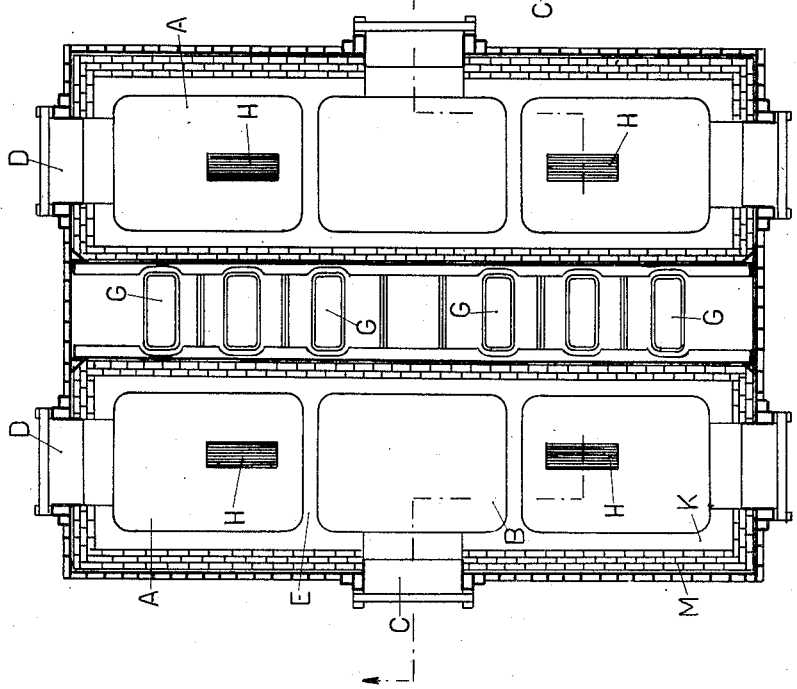

April 1, 1958  M. KHEK  2,829,184
LOW FREQUENCY INDUCTION FURNACE FOR
MELTING NON-FERROUS METALS
Filed July 28, 1955  5 Sheets-Sheet 4

INVENTOR
Massimiliano Khek
BY
ATTORNEY

INVENTOR
Massimiliano Khek

United States Patent Office 2,829,184
Patented Apr. 1, 1958

2,829,184

LOW FREQUENCY INDUCTION FURNACE FOR MELTING NON-FERROUS METALS

Massimiliano Khek, Milan, Italy

Application July 28, 1955, Serial No. 525,022

Claims priority, application Italy August 13, 1954

7 Claims. (Cl. 13—33)

Most existing low frequency induction furnaces for melting non-ferrous metals such as zinc, copper, aluminum, etc. and their alloys, have circular melting channels attached to the basin of the furnace or laterally or on the bottom. This kind of structure which is of widespread use the known disadvantage of difficult access to the melting channels, which can be cleaned only with special tools (chains or other scrapers).

Another inconvenience of the existing furnaces consists in the insufficient mechanical resistance of the circular channels, which is due to both an electrodynamical phenomenon (Pinch effect) and to the greater heat stressing of the channel as compared with the bath. That is to say, there must be a gradient of temperature between the channel and bath, so that a transfer of heat and energy may take place from the former to the latter (as a rule, about 200° C.).

All these inconveniences of the existing low frequency melting furnaces have led to the design and manufacture of furnaces with straight melting channels. In these furnaces the basin of the furnace is divided into two parts defining a working chamber and a pouring chamber, respectively, and between which there is provided a space for accommodating the furnace transformers.

The transformers with their magnetic cores and coils form the primary circuit of the furnace. It is possible to provide at will single-phase, two-phase and three-phase connections or even combined three-phase or two phase Scott connections with the 42–60 cycle feed main.

Between the primary coils there are arranged the straight melting channels, of large size and easy accessibility, which contain the liquid melting and transfer heat to the chambers. One of these chambers is the charging chamber wherein the cold charge is introduced, while the other chamber contains the completely fused bath and serves also as a waiting and tapping chamber. It is clear that the mechanical stressing of the straight channels is smaller than that of the circular channels and that the mechanical solidity of the most sensitive part of a low frequency furnace, that is, of the melting channels, is greater in this construction, also by reason of the lower gradient of temperature between the channel and bath (about 25–50° C.). The obstruction of straight channels with metal is not so likely and the accessibility and possibility of cleaning are better too.

Low frequency furnaces previously designed with straight channels and two chambers have had the inconvenience of not permitting an even distribution of power between said chambers. Heat transfer from the channels to the two chambers of the furnace, that is, to the charging chamber with the cold charge and to the pouring chamber with the liquid bath, is nearly equal, while it would be more convenient to convey the maximum of heat energy to the cold material so as to supply heating energy as well as melting energy for the metal to be melted. In the pouring chamber all that is needed is to keep the bath at a constant temperature or to overheat it slightly.

In two-chamber furnaces in use so far, the solid material is charged into the furnace only from one side, while tapping is effected at the opposite side, whereas the overheated liquid material is ejected from the melting channels, by the effect of well-known electrodynamic phenomena, at equal temperature towards both basins.

It is easy to understand that the temperature of the bath in the charging chamber continually supplied with cold material, is lower than that in the so-called waiting or pouring chamber. In a furnace having such construction, no temperature adjustment is possible.

In order to avoid the above inconvenience, furnaces with more than two chambers have been built, e. g. with three chambers, four chambers etc., with most of the chambers acting as melting chambers, and one or two as pouring chambers. Assuming a furnace with three chambers with two groups of three-phase transformers, one of the two transformers, that is, the one which is provided between the charging chambers, works at full power rate while the other transformer works at reduced power in order to prevent overheating of the bath. Overheating is obnoxious to the material, in that it forms oxides and this is equivalent to losing material as well as to high losses of calories viz. of electrical energy consumed uselessly. While this solution has made it possible to build big furnaces, it should be pointed out that further improvements are necessary to utilize the energy wasted so far and to improve the efficiency of electric low frequency furnaces.

The present invention relates to a low frequency induction melting furnace with straight channels, which comprises two or more working chambers separated from one another by sets of transformers and by refractory vaults which are conveniently arranged, and providing, for each chamber, a charging column and, for each individual transformer, two charging columns; the power of the transformer being subdivided in such a manner that all of the transformers work at full rate or, if desired, at reduced rate in accordance with the needs of the production to be obtained, whether at constant and equal temperature in all of the chambers, or at variable temperatures on the various chambers.

The two columns between which there is always a transformer, ensure a perfect equilibrium of temperature in the chambers, since the liquid and overheated masses, in leaving the channels, lap the cold masses descending from the hoppers and constituting the charge of the furnace.

The equilibrium of temperature involves not only advantages with respect to the efficiency of the furnace, but what is more important it serves to protect the most delicate part of every low frequency induction furnace, namely the refractory portion of the furnace linings.

It will be easily understood that a furnace with two or more chambers which are continually sujected to stresses produced in the channels by the well-known electromechanical forces and in which every chamber has a different temperature, is much more stressed than a furnace wherein a perfect equilibrium of temperature is maintained.

However, if it should be desired sometimes to vary the temperature although running at full rate, this can be done through that charging column where the highest temperature is wanted.

Further, in the furnace embodying this invention the transformer has been developed in such a manner as to have various subsidiary taps available on its coils which represent the primary, and which may be switched over by hand or by remote control.

It is well-known that the efficiency of a furnace is improved if it runs at full rate, that is, at maximum voltage, Unfortunately, production requirements often do not allow for running at full rate and furnaces built for an output of 300 tons a day, may run for as long as six months with an output of one-half or less of the designed output. In that case, and always if for any reason one is obliged to run the furnace at reduced power, the transformer of the furnace coils are varied in accordance with the output desired and one always tries to run with the line voltage.

The advantages of the present invention may be summarized as follows:

(1) Perfect equilibrium of temperature in the individual chambers, due to the fact that each chamber is provided with at least one adjustable charging column.

(2) All of the chambers can act as melting chambers as well as tapping chambers with or without a superficial partition vault.

(3) Longer life for the refractories and smaller risk of breakage thereof not only when starting the furnace, but also during running and during the waiting and resting periods of the furnace. This is due to the fact that the equilibrium of temperature in the liquid metal in all of the chambers results in an equal expansion and stress of the linings in the various chambers.

(4) Higher efficiency and output of the furnace, due to the fact that the otherwise wasted and undesirable energy of overheating is utilized for melting. The losses of calories of certain previously existing furnaces attain values higher than 20% of the energy consumption; utilization of this amount for re-melting provides a sensible increase of output.

(5) Adaptability of the furnace to any surroundings, since it is possible to arrange the charging and pouring chambers in the manner so as to meet any needs of practice.

Figs. 3, 4 and 5 are diagrammatic top plan views of other embodiments of the invention;

Fig. 6 is a vertical sectional view of another embodiment of the invention;

Fig. 7 is a top plan view of the furnace of Fig. 6;

Figs. 8, 9 and 10 are diagrammatic top plan views of still other embodiments of the invention;

Figures 1 and 2 illustrate one embodiment of the invention having two charging columns, two melting chambers and two pouring basins.

In the middle of the two chambers "A" there is provided a three-phase transformer "G" to form the primary circuit of the furnace. Channels "F," called melting channels, form the secondary of the furnace and are six in number. One of the two chambers "A" is subdivided by two superficial vaults "E" of refractory material, to form therein the two pouring basins "B."

The vaults "E" serve to retain the slag in such a way that the basins "B" always remain clean and ready for pouring.

Figure 1:
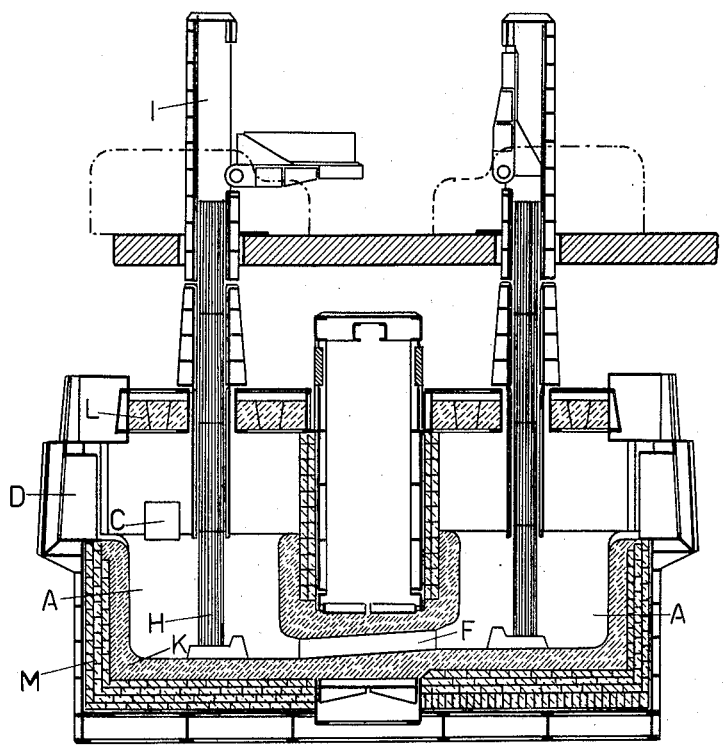
Fig. 1 is a vertical sectional view of a furnace embodying the present invention.
Figure 2:
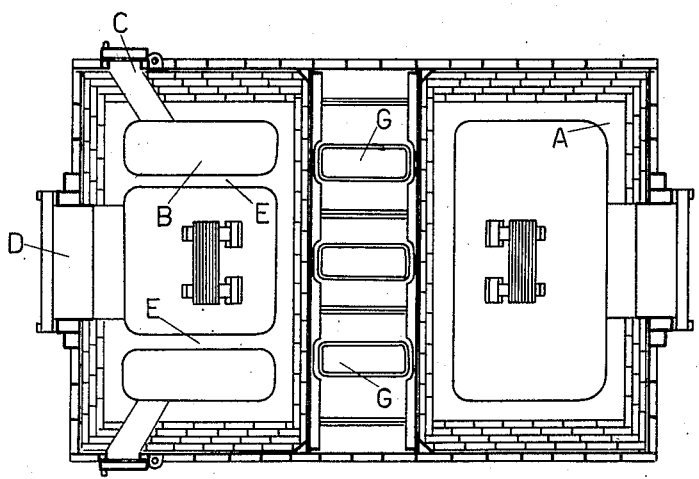
Fig. 2 is a top plan view of the furnace of Fig. 1.

In said Figures 1 and 2 linings "K" of refractory material extend around the furnace transformers.

The following references are the same throughout all views of the drawings:

A, chambers for melting, charging and pouring;
B, pouring basin;
C, pouring door;
D, scarifying door;
E, superficial refractory vault;
F, melting channels;
G, furnace transformers;
H, charging column;
I, charging hopper;
K, refractory lining;
L, furnace cover;
M, refractory and insulating bricks.

In Fig. 3, there is shown a furnace with two melting chambers "A" and four pouring basins "B" separated by a group of three-phase transformers "G" and two charging columns "H," namely one column for each melting chamber.

Fig. 4 shows a furnace with two melting chambers "A," three charging columns "H," one three-phase transformer "G," one pouring basin "B" and two superficial vaults "E" which in one of the melting chambers "A" divide the two charging columns from the pouring basin.

Fig. 5 represents a furnace with two melting chambers "A," four charging columns "H," one three-phase transformer "G," two pouring basins "B" and four superficial vaults "E" which, in both melting chambers, divide the four charging columns from the two pouring basins.

Figures 6 and 7 illustrate a furnace with two melting chambers "A," four charging columns "H," two groups of transformers "G" and four superficial vaults "E" which, in both melting chambers divide the four charging columns from the two pouring basins.

In the middle of the two chambers "A" there are two groups of three-phase transformers "G" which form the primary circuits of the furnace. Refractory linings "K" are provided around the transformers, while twelve melting channels "F" are provided in the furnace, six for each transformer unit, to form the secondary circuit.

Fig. 8 shows a furnace with two basins "A" with two transformer units "G" therebetween and four charging columns "H." Two superficial vaults "E" divide the two columns of one of the basins "A," from the two respective pouring basins.

Fig. 9 represents a furnace having two basins "A" with two transformer units "G" therebetween and four charging columns "H." Four superficial vaults "E," two in each of the basins, divide the four charging columns from the four pouring basins "B."

Fig. 10 represents a furnace with two basins "A," but with three groups of three-phase transformers "G" therebetween and with eighteen melting channels "F" (not shown). Six charging columns "H" are provided, three for each basin, and four superficial vaults "E" divide the charging columns from the four pouring basins "B."

Figure 11:
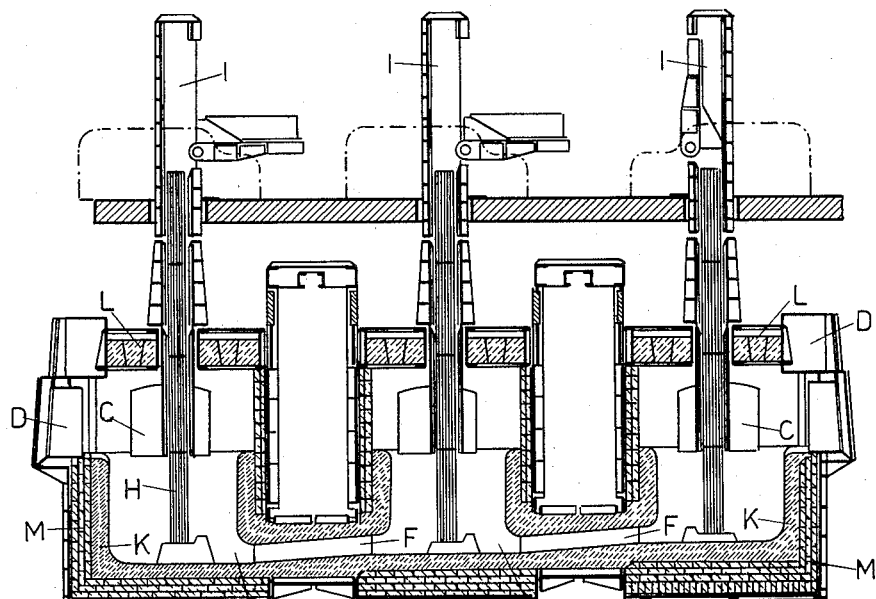
Fig. 11 is a view similar to that of Fig. 1, but showing still another embodiment of the invention.
Figure 12:
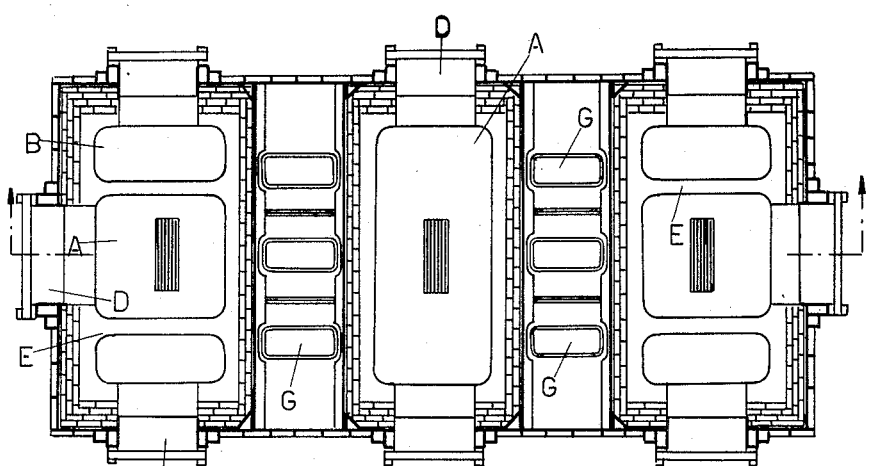
Fig. 12 is a top plan view of the furnace of Fig. 11.

Figures 11 and 12 illustrate a furnace with three melting basins "A," three charging columns "H," two groups of transformers "G" which separate the three melting basins "A" from each other. The melting basins communicate through twelve melting channels "F," arranged six for each transformer unit. The four pouring basins "B" which are located in the basins "A" at the ends of the furnace are divided by four superficial vaults "E" from the charging columns. The transformers form the primary and the melting channels form the secondary of the furnace.

Figure 13:
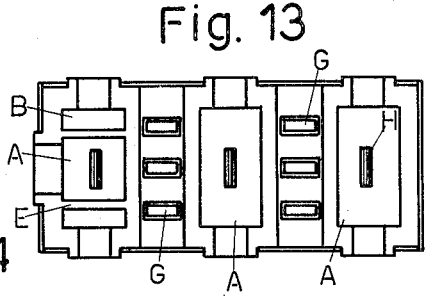
Figs. 13, 14, 15, 16 and 17 are respectively diagrammatic top plan views of still further embodiments of the invention.

Fig. 13 represents a furnace with three melting chambers "A," three charging columns "H," two groups of three-phase transformers "G" and only two pouring basins "B" at one end of the furnace.

Figure 14:
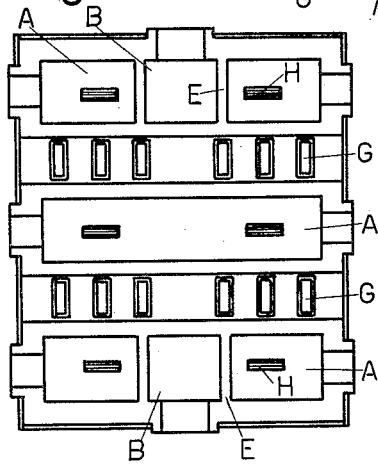

Fig. 14 represents a furnace having three melting chambers "A" and four groups of three-phase transformers "G" arranged two-by-two between the melting chambers, with 24 melting channels "F" (not shown) being arranged six for each transformer unit.

The three melting chambers "A" are divided from one another by two groups of three-phase transformers so that adjacent melting chambers are communicated by twelve melting channels "F" (not shown). At the two ends there are provided a central pouring basin "B," divided from the charging columns "H" by the separating vaults "E." Six charging columns are provided, two for each melting chamber.

Figure 15:
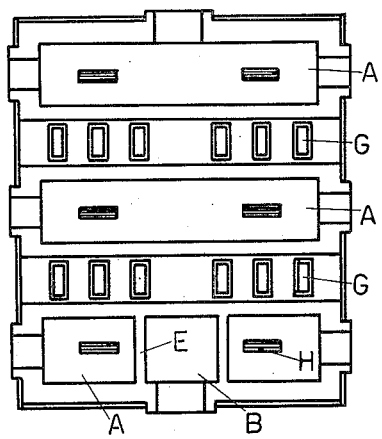

Fig. 15 shows a furnace with three melting chambers "A," four groups of three-phase transformers "G," 24 melting channels "F" (not shown), six charging columns "H" and a single pouring basin "B" placed at the center of one of the ends of the furnace.

Figure 16:
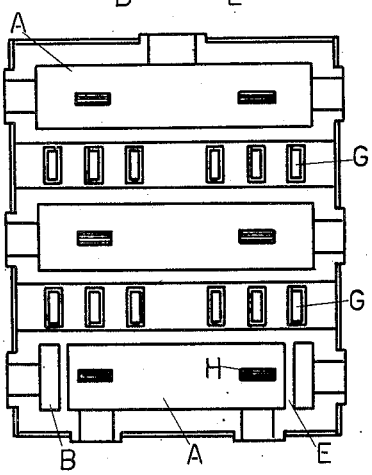

Fig. 16 represents a furnace with three melting chambers "A," six charging columns "H," four groups of three-phase transformers "G" and two pouring basins "B" arranged at the outer sides of one of the melting basins "A."

Figure 17:
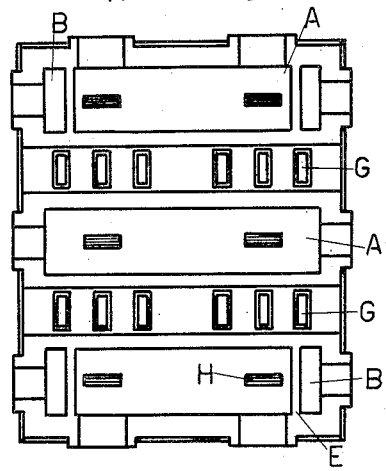

Fig. 17 shows a furnace with three melting chambers "A," six charging columns "H," four groups of three-phase transformers "G" and four melting basins "B" arranged at the outer sides of both of the end basins.

From the illustrative embodiments of the invention it will be apparent that the arrangement of the chambers, of the charging hoppers, of the pouring basins as well as the proportioning of the transformers permit direct supplying of the cold charge into the melting chambers through the charging hoppers which form the so-called charging columns, with the maximum amount of energy being available for melting and for maintaining the temperature required for pouring. The charging columns moreover have the advantage of pre-heating the cold metal and of drying the charge, for example, in cases in which the charge comes from electrolytic baths, with resulting substantial improvement of the efficiency of the furnace.

Of course, furnaces according to the invention may be constructed with more than four melting chambers and indefinite numbers of three-phase, two phase and single-phase transformer units according to the power required and the daily output to be obtained. Also the pouring basins may be provided with or without a superficial vault of refractory material, according to the pouring method to be used.

I claim:

1. A low frequency induction furnace for melting non-ferrous metals comprising a furnace structure having at least two working chambers each defining at least one melting zone, vaults of refractory material in at least one of said working chambers to define at least one pouring basin therein segregated from the related melting zone and a pouring port opening from each pouring basin, a series of transformers disposed between each working chamber and each other working chamber adjacent thereto, said furnace structure further having straight melting channels extending past each series of transformers and opening into the working chambers between which the related series of transformers is disposed, and at least one charging hopper opening into each melting zone of each working chamber and providing a continuous charging column which is submerged, at its lower end, in the already molten metal in the related melting zone so that molten metal is continuously passed into each pouring basin with slag removed therefrom by the related vaults and is available for continuous discharge from the related pouring port.

2. A low frequency induction furnace as in claim 1; wherein said straight melting channels all slope in the same direction.

3. A low frequency induction furnace as in claim 1; wherein said working chambers are two in number with a single series of said transformers therebetween, and only one of said working chambers has said vaults therein dividing the interior of said one working chamber into a single melting zone and two pouring basins disposed respectively at the opposite sides of said single melting zone.

4. A low frequency induction furnace as in claim 1; wherein said working chambers are three in number and disposed one after the other to constitute a central working chamber and end working chambers at opposite sides of said central chamber with two series of transformers disposed between said central working chamber and said end working chambers at opposite sides of the central working chambers, respectively; and wherein each of said end working chambers has said vaults therein dividing the interior of each end working chamber into a single melting zone having a continuous charging column submerged therein and two pouring basins at the opposite sides, respectively, of the single melting zone of the related end working chamber.

5. A low frequency induction furnace as in claim 1; wherein said working chambers are two in number with a single series of said transformers therebetween; and wherein each of said working chambers has said vaults therein dividing the interior of each working chamber into a single pouring basin at the center thereof and two melting zones disposed at opposite sides of the related pouring basin and each having a related charging column submerged therein.

6. A low frequency induction furnace as in claim 1; wherein said working chambers are three in number and disposed one after the other to constitute a central working chamber and end working chambers at the opposite sides of said central chamber with two series of said transformers disposed between said central chamber and said end chambers at the opposite sides, respectively, of the central chamber; and wherein only one of said end working chambers has said vaults therein dividing the interior of said one end working chamber into a central pouring basin and two melting zones at opposite sides of said central pouring basin; and wherein two charging columns extend into said two melting zones of said one end working chamber and into said central working chamber and the other of said end working chambers, respectively.

7. A low frequency induction furnace as in claim 1; wherein said working chambers are only two in number with a single series of said transformers therebetween, and each of said working chambers has said vaults therein dividing the interior of the related chamber into a central melting zone and two pouring basins at opposite sides, respectively, of said melting zone; and wherein more than two charging columns are submerged in the molten metal in said melting zone of each of said working chambers.

References Cited in the file of this patent

UNITED STATES PATENTS

| | | |
|---|---|---|
| 1,235,630 | Wyatt | Aug. 7, 1917 |
| 1,996,012 | Schwab | Mar. 26, 1935 |
| 2,415,376 | Strickland | Feb. 4, 1947 |
| 2,427,817 | Tama | Sept. 23, 1947 |
| 2,579,634 | Warren | Dec. 25, 1951 |